US012393452B2

(12) United States Patent
McCrary

(10) Patent No.: US 12,393,452 B2
(45) Date of Patent: *Aug. 19, 2025

(54) DISTRIBUTED USER MODE PROCESSING

(71) Applicant: ADVANCED MICRO DEVICES, INC., Santa Clara, CA (US)

(72) Inventor: Rex Eldon McCrary, Orlando, FL (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/597,568

(22) Filed: Mar. 6, 2024

(65) Prior Publication Data

US 2024/0320042 A1 Sep. 26, 2024

Related U.S. Application Data

(63) Continuation of application No. 17/946,213, filed on Sep. 16, 2022, now Pat. No. 11,934,873, which is a continuation of application No. 16/721,456, filed on Dec. 19, 2019, now Pat. No. 11,461,137.

(51) Int. Cl.
*G06F 9/54* (2006.01)
*G06F 9/30* (2018.01)
*G06F 9/38* (2018.01)
*G06F 9/48* (2006.01)
*G06F 12/0831* (2016.01)

(52) U.S. Cl.
CPC ........ *G06F 9/4893* (2013.01); *G06F 9/30079* (2013.01); *G06F 9/3867* (2013.01); *G06F 9/542* (2013.01); *G06F 9/544* (2013.01); *G06F 12/0835* (2013.01)

(58) Field of Classification Search
CPC ............................ G06F 9/4843; G06F 9/4881
See application file for complete search history.

(56) References Cited

U.S. PATENT DOCUMENTS 10,600,141 B2 * 3/2020 Dunn ...................... G06T 1/60

* cited by examiner

*Primary Examiner* — Andy Ho

(57) ABSTRACT

A first processing unit such as a graphics processing unit (GPU) pipelines that execute commands and a scheduler to schedule one or more first commands for execution by one or more of the pipelines. The one or more first commands are received from a user mode driver in a second processing unit such as a central processing unit (CPU). The scheduler schedules one or more second commands for execution in response to completing execution of the one or more first commands and without notifying the second processing unit. In some cases, the first processing unit includes a direct memory access (DMA) engine that writes blocks of information from the first processing unit to a memory. The one or more second commands program the DMA engine to write a block of information including results generated by executing the one or more first commands.

19 Claims, 4 Drawing Sheets

DISTRIBUTED USER MODE PROCESSING

CROSS-REFERENCE TO RELATED APPLICATIONS

The present application is a Continuation application of U.S. patent application Ser. No. 17/946,213, entitled "DISTRIBUTED USER MODE PROCESSING", and filed Sep. 16, 2022, now issued as U.S. Pat. No. 11,934,873, which is a Continuation application of U.S. patent application Ser. No. 16/721,456, entitled "DISTRIBUTED USER MODE PROCESSING", and filed on Dec. 19, 2019, now issued as U.S. Pat. No. 11,461,137 the entirety of which is incorporated by reference herein.

BACKGROUND

Conventional processing systems include a central processing unit (CPU) and a graphics processing unit (GPU) that implements pipelines to perform audio, video, and graphics applications, as well as general purpose computing for some applications. Applications are represented as a static programming sequence of microprocessor instructions grouped in a program or as processes (containers) with a set of resources that are allocated to the application during the lifetime of the application. The CPU performs user mode operations for applications including multimedia applications. For example, an operating system (OS) executing on the CPU locates audio or video containers for a multimedia application, retrieves the content, and initiates graphics processing by issuing application programming interface (API) calls (e.g., draw calls) to the GPU. A draw call is a command that is generated by the CPU and transmitted to the GPU to instruct the GPU to render an object in a frame (or a portion of an object). The CPU implements a user mode driver (UMD) that generates the appropriate commands for the draw call and writes them into a command buffer for processing by the GPU. The draw call includes information defining tasks, registers, textures, states, shaders, rendering objects, buffers, and the like that are used by the GPU to render the object or portion thereof. The GPU renders the object to produce values of pixels that are provided to a display, which uses the pixel values to display an image that represents the rendered object.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
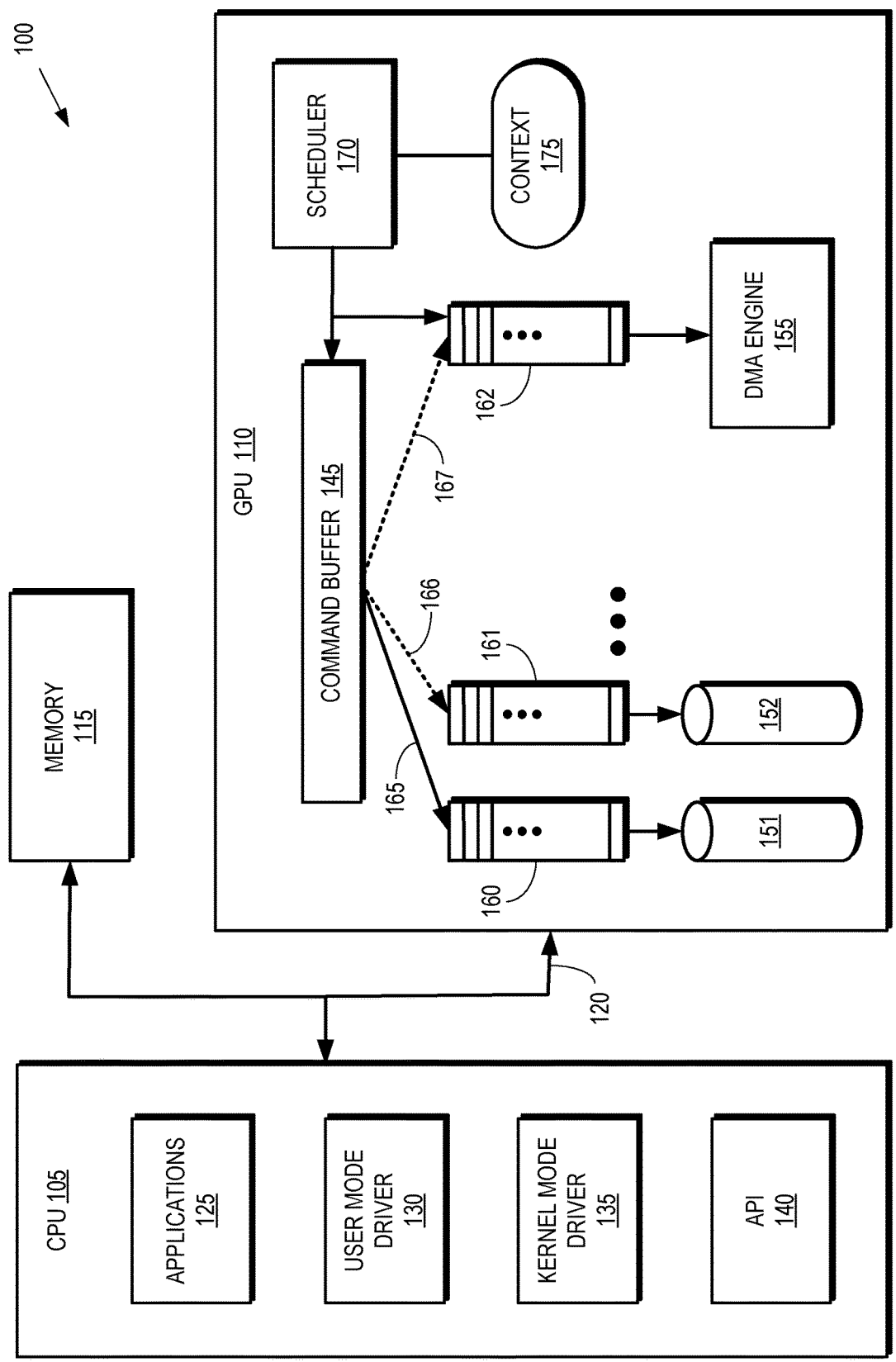
FIG. 1 is a block diagram illustrating a processing system that implements distributed user mode processing according to some embodiments.

A conventional CPU performs all user mode operations for an application and the user mode operations generate the commands that are streamed to the GPU for execution. As used herein, the term "user mode" refers to a mode of operation of a processing unit that includes creating a process for the application, allocating a private virtual address space to the application, and allocating a private handle table for the application. The CPU submits the command stream to the GPU in execution order and so the CPU waits for a notification from the GPU before proceeding with subsequent commands. For example, a conventional CPU operating in the user mode dispatches a command buffer including a set of commands that are to be executed by a conventional GPU, which executes the command buffer and returns an acknowledgment indicating completion of the command buffer. In response to receiving the acknowledgment, the CPU provides one or more additional command buffers to the GPU. Thus, the CPU controls which commands are selected for execution by the GPU and when the GPU will execute these commands.

The message exchange between the CPU and the GPU can introduce unnecessary latency. For example, a conventional GPU includes a direct memory access (DMA) engine to read and write blocks of memory stored in a system memory. The CPU provides commands that operate on information read from the system memory and commands that produce information for storage in the system memory. In order to write information produced by a first set of commands executed by the GPU, such as a draw call, the GPU notifies the CPU that the first set of commands is complete and, in response, the CPU generates a second set of commands to program the DMA engine to write the information back to the system memory. The DMA engine therefore delays writing back the information until after the message exchange between the CPU and the GPU is complete. This delay is unnecessary because the GPU "knows" that the second set of commands should be submitted to the DMA engine in response to completing the first set of commands and therefore the GPU does not need to ask the CPU to submit the second set of commands. In addition to increasing latency, the packets transmitted from the CPU to the GPU are relatively verbose and consume significant bandwidth in the processing system. Furthermore, adjustments to the processing to address issues, such as a reduced number of frames per second (FPS), require sending the feedback from the GPU to the CPU and waiting for the CPU to determine an appropriate response, which increases latency and bandwidth consumption.

FIGS. 1-4 disclose embodiments of a GPU that operate in user mode and schedule commands without notifying the CPU that previous commands are complete, which expands the capabilities of the GPU while reducing bandwidth consumption and CPU overhead. In some embodiments, the CPU transmits a first command to the GPU for execution. The GPU executes the first command and then schedules a second command in response to completing execution of the first command. For example, if the first command is included in a draw call that causes the GPU to execute the first command to generate pixels for presentation by a display, the GPU schedules a second command in user mode to program a direct memory access (DMA) engine to write the results of the first command to system memory, thereby reducing the latency of the DMA access. Other examples of commands that are executed by the GPU in user mode include, but are not limited to, executing a filtering algorithm, launching a new shader based on a current state of the GPU, or modifying a number of frames per second (FPS) for the application. In some embodiments, the CPU transmits a packet including an address of the first command (such as a draw call) and associated state information that is used to configure the context of the GPU when executing the first command. The GPU validates the state information and then executes the first command if the state information is successfully validated. In some embodiments, the packets include security information or validation information that is used by the GPU to authorize and authenticate the first packet prior to accessing information at the address included in the packet. The GPU identifies the second command based on the information provided by the CPU and schedules the second command based on the current GPU context, e.g., by dispatching the second command to a corresponding queue such as a queue associated with the DMA engine. The user mode operations enable the GPU to perform more complex operations besides processing an in-lined stream of commands received from the CPU. While operating in the user mode, the GPU can modify state information based on results of executing the commands in the draw call. For example, the GPU can modify the state information to improve the rendered frames per second (FPS), while keeping the power consumption within a predetermined power envelope for the GPU.

FIG. 1 is a block diagram illustrating a processing system 100 that implements distributed user mode processing according to some embodiments. The processing system 100 includes a central processing unit (CPU) 105 for executing instructions such as draw calls and a graphics processing unit (GPU) 110 for performing graphics processing and, in some embodiments, general purpose computing. The processing system 100 also includes a memory 115 such as a system memory, which is implemented as dynamic random access memory (DRAM), static random access memory (SRAM), nonvolatile RAM, or other type of memory. The CPU 105, the GPU 110, and the memory 115 communicate over an interface 120 that is implemented using a bus such as a peripheral component interconnect (PCI, PCI-E) bus. However, other embodiments of the interface 120 are implemented using one or more of a bridge, a switch, a router, a trace, a wire, or a combination thereof. The processing system 100 is implemented in devices such as a computer, a server, a laptop, a tablet, a smart phone, and the like.

The CPU 105 executes processes such as one or more applications 125 that generate commands, a user mode driver 130, a kernel mode driver 135, and other drivers. The applications 125 include applications that utilize the functionality of the GPU 110, such as applications that generate work in the processing system 100 or an operating system (OS). Some embodiments of the application 125 generate commands that are provided to the GPU 110 over the interface 120 for execution. For example, the application 125 can generate commands that are executed by the GPU 110 to render a graphical user interface (GUI), a graphics scene, or other image or combination of images for presentation to a user.

Some embodiments of the application 125 utilize an application programming interface (API) 140 to invoke the user mode driver 130 to generate the commands that are provided to the GPU 110. In response to instructions from the API 140, the user mode driver 130 issues one or more commands to the GPU 110, e.g., in a command stream or command buffer. The GPU 110 executes the commands provided by the API 140 to perform operations such as rendering graphics primitives into displayable graphics images. Based on the graphics instructions issued by application 125 to the user mode driver 130, the user mode driver 130 formulates one or more graphics commands that specify one or more operations for GPU 105 to perform for rendering graphics. In some embodiments, the user mode driver 130 is a part of the application 125 running on the CPU 105. For example, a gaming application running on the CPU 105 can implement the user mode driver 130.

The GPU 110 receives command buffers 145 (only one is shown in FIG. 1 in the interest of clarity) from the CPU 105 via the interface 120. The command buffer 145 includes sets of one or more commands for execution by one of a plurality of concurrent graphics pipelines 151, 152. Although two pipelines 151, 152 are shown in FIG. 1, the GPU 110 can include any number of pipelines. The GPU 110 also includes a direct memory access (DMA) engine 155 that reads or writes blocks of information from the memory 115. Queues 160, 161, 162 (collectively referred to herein as "the queues 160-162") are associated with the pipelines 151, 152 and the DMA engine 155. The queues 160, 161 hold command buffers for the corresponding queues 151, 152 and the queue 162 holds one or more commands for the DMA engine 155. In the illustrated embodiment, the command buffer 145 is stored in an entry of the queue 160 (as indicated by the solid arrow 165), although other command buffers received by the GPU 110 are distributed to the other queues 161, 162 (as indicated by the dashed arrows 166, 167). The command buffers are distributed to the queues 160-162 using a round-robin algorithm, randomly, or according to other distribution algorithms.

A scheduler 170 schedules command buffers from the head entries of the queues 160-162 for execution on the corresponding pipelines 151, 152 and the DMA engine 155, respectively. In some circumstances, the GPU 110 operates in a user mode so that the scheduler 170 is able to generate and schedule commands in addition to the commands that are received from the user mode driver 130 in the CPU 105. The scheduler 170 schedules the commands for execution on the pipelines 151, 152 or the DMA engine 155 without notifying the CPU 105. The scheduler 170 provides the commands to the command buffer 145 or directly to the queue 162. In some embodiments, the user mode driver 130 provides one or more first commands to the GPU 110, e.g., in the command buffer 145. The scheduler 170 schedules the first commands from the command buffer 145 for execution on one or more of the pipelines 151, 152. In response to completing execution of the first commands, the scheduler 170 identifies or generates one or more second commands for execution. The scheduler 170 then schedules the one or more second commands for execution without notifying the CPU 105. For example, if the first commands include a draw call that causes one or more of the pipelines 151, 152 to generate information representing pixels for display, the scheduler 170 generates and schedules one or second commands program the DMA engine 155 to write (to the memory 115) a block of information including results generated by executing the one or more first commands.

The GPU 110 schedules and executes commands based on a current context 175. Some embodiments of the CPU 105 transmit packets to the GPU 110 including an address indicating locations of one or more first commands and state information that is used to configure the context 175 of the GPU 110. The GPU 110 modifies the state information that configures the context 175 in some situations. For example, the GPU 110 can modify the state information based on the results of executing the one or more first commands. Modifying the state information can improve a frames-per-second (FPS) rendered by the plurality of pipelines 151, 152 concurrently with maintaining power consumption of the GPU 110 within a predetermined power envelope.

Figure 2:
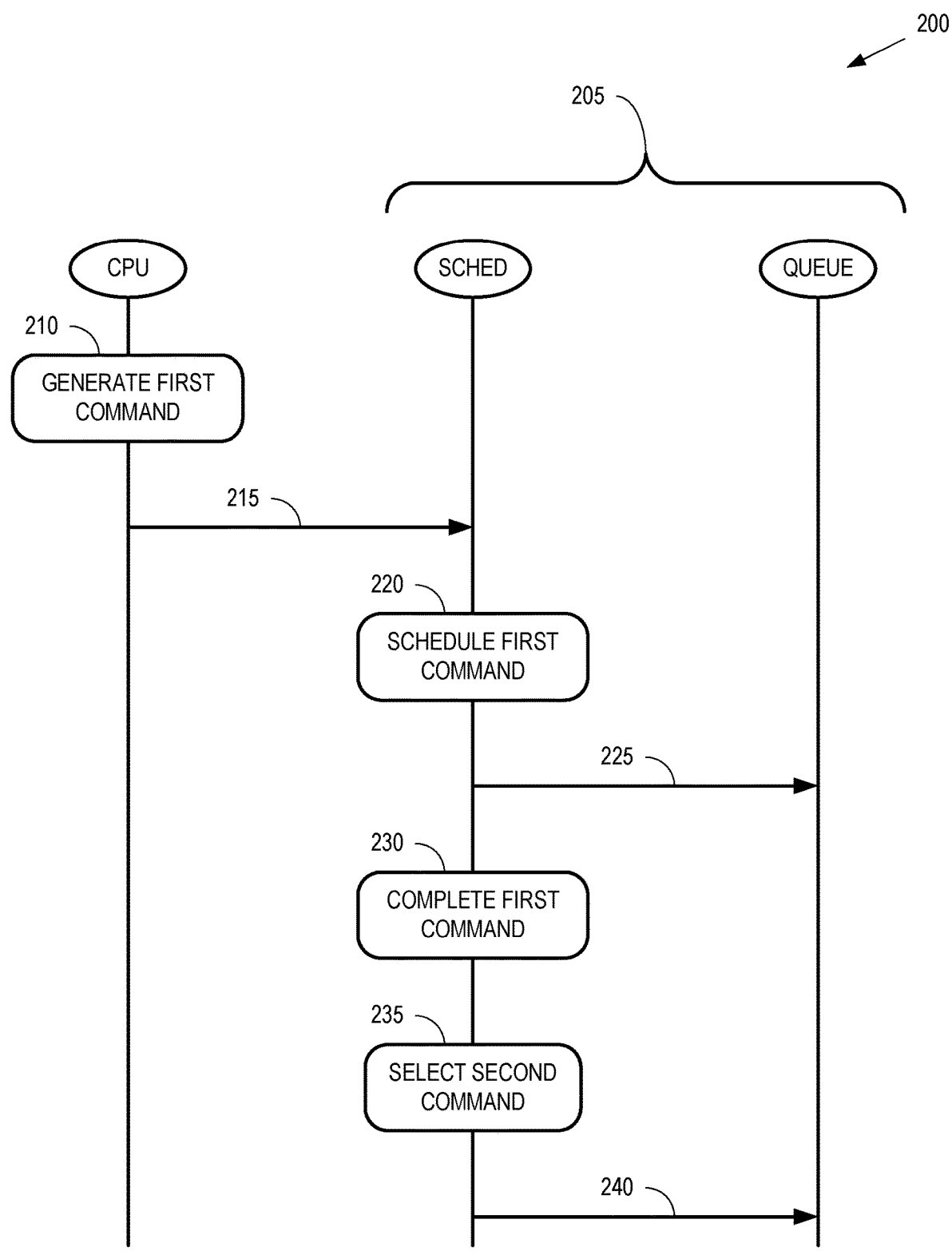
FIG. 2 is a message flow that is used for distributed user mode processing according to some embodiments.

FIG. 2 is a message flow 200 that is used for distributed user mode processing according to some embodiments. The message flow 200 is implemented in some embodiments of the processing system 100 shown in FIG. 1. The message flow 200 shows actions performed by, and messages exchanged between, a CPU and a GPU 205 that includes a scheduler (SCHED) and one or more queues, which are collectively represented by the bubble labelled QUEUE.

At block 210, the CPU generates one or more first commands for execution by the GPU 205. In some embodiments, the one or more first commands are included in a draw call that is transmitted to the GPU 205. The draw call includes information such as an address indicating locations of one or more first commands and state information that is used to configure a context of the GPU 205. The CPU then transmits (at arrow 215) the first commands to the GPU. In some embodiments, the CPU transmits the first commands and any other information to the GPU 205 in a packet.

At block 220, the scheduler in the GPU 205 schedules the received first commands for execution and the scheduled first commands are provided (at arrow 225) to one or more queues. For example, the scheduler in the GPU 205 can schedule a command buffer including the first commands and provide the command buffer to the queues.

At block 230, the GPU 205 determines that the first commands have completed execution. For example, the pipeline that is executing the first commands can provide an indication that the first commands have retired, which indicates that execution of the first commands is complete.

At block 235, the GPU 205 selects one or more second commands for execution. Selecting the one or more second commands can include identifying the second commands or generating the second commands, e.g., based on the current context of the GPU 205. For example, the GPU 205 can generate second commands that program a DMA engine to write the results produced by executing the first commands to a memory. The one or more second commands are then provided (at arrow 240) to one of the queues. The GPU 205 selects the one or more second commands and provides (at arrow 240) the commands to the queues without notifying the CPU, thereby reducing latency by eliminating and unnecessary message exchange with the CPU.

Figure 3:
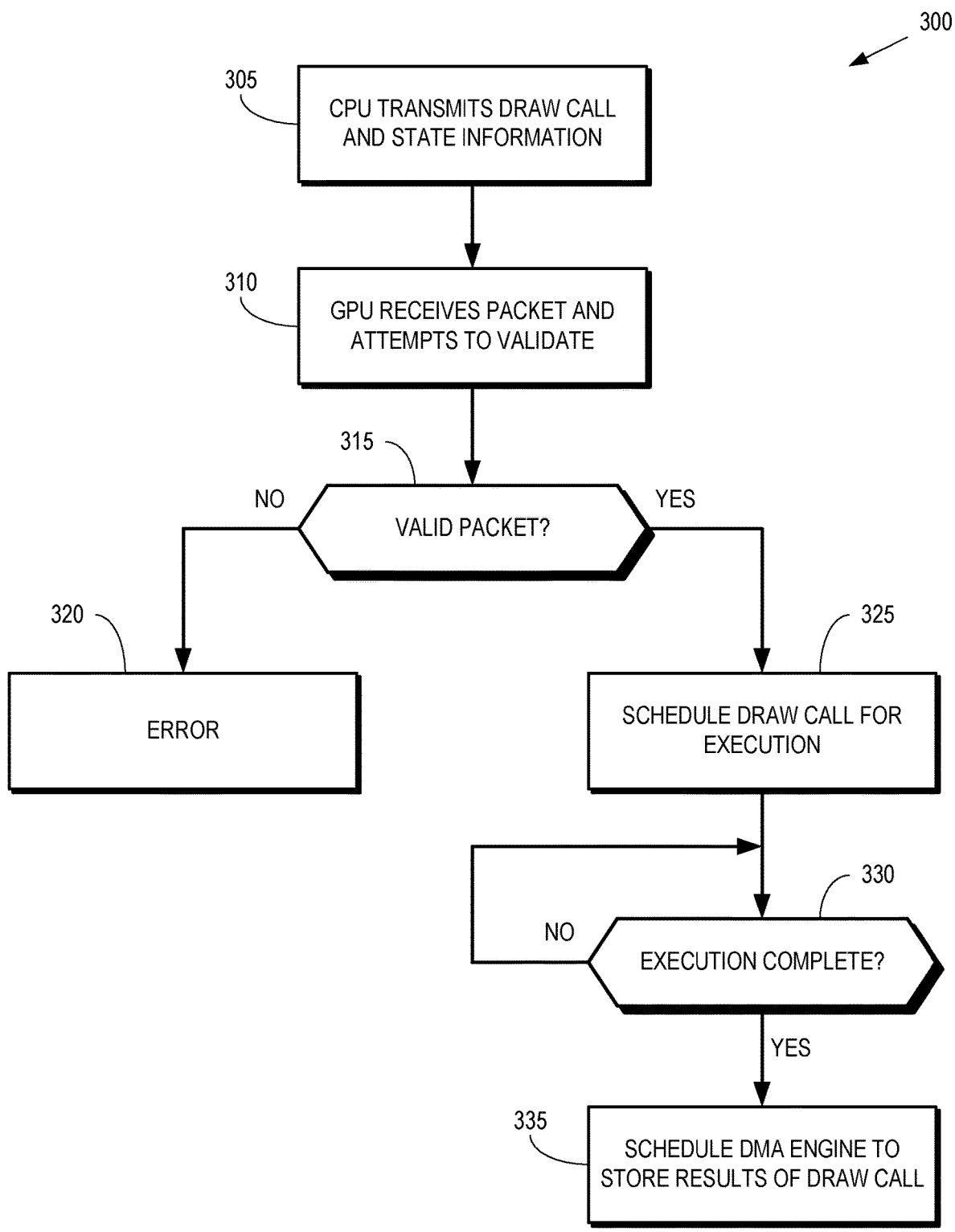
FIG. 3 is a flow diagram of a method of validating packets received by a graphics processing unit (GPU) during distributed user mode processing according to some embodiments.

FIG. 3 is a flow diagram of a method 300 of validating packets received by a GPU during distributed user mode processing according to some embodiments. The method 300 is implemented in some embodiments of the processing system 100 shown in FIG. 1.

At block 305, a CPU such as the CPU 105 shown in FIG. 1 transmits a packet including a draw call and state information that is used to configure a context of a GPU such as the GPU 110 that executes the commands included in the draw call. In some embodiments, the draw call includes an address that indicates a location that stores the commands associated with the draw call. The location is in a memory such as the memory 115 shown in FIG. 1 or an associated cache. The draw call also includes security information or validation information that is used to authorize and authenticate the packet prior to accessing information at the address included in the packet.

At block 310, the GPU receives the packet and attempts to validate the packet based on the information included in the packet. In some embodiments, the GPU implements an authorization or authentication procedure to validate the packet.

At decision block 315, the GPU determines whether the packet is valid. If not, the method 300 flows to block 320 and the GPU generates an error message, which is returned to the CPU. If the GPU successfully validates the packet, the method 300 flows to block 325.

At block 325, a scheduler in the GPU schedules the commands in the draw call for execution. In some embodiments, the scheduler dispatches the commands to one or more queues associated with one or pipelines that execute the commands in the draw call.

At decision block 330, the scheduler determines whether execution of the commands in the draw call is complete. As long as the commands are not complete, the scheduler continues to monitor progress of the scheduled commands in the draw call. In response to determining that the commands in the draw call have completed execution, the method 300 flows to block 335.

At block 335, commands that program a DMA engine in the GPU are scheduled by the scheduler in the GPU, which also dispatches the commands to a queue associated with the DMA engine. The commands program the DMA engine to store results of executing the draw call in a memory such as the memory 115 shown in FIG. 1.

Figure 4:
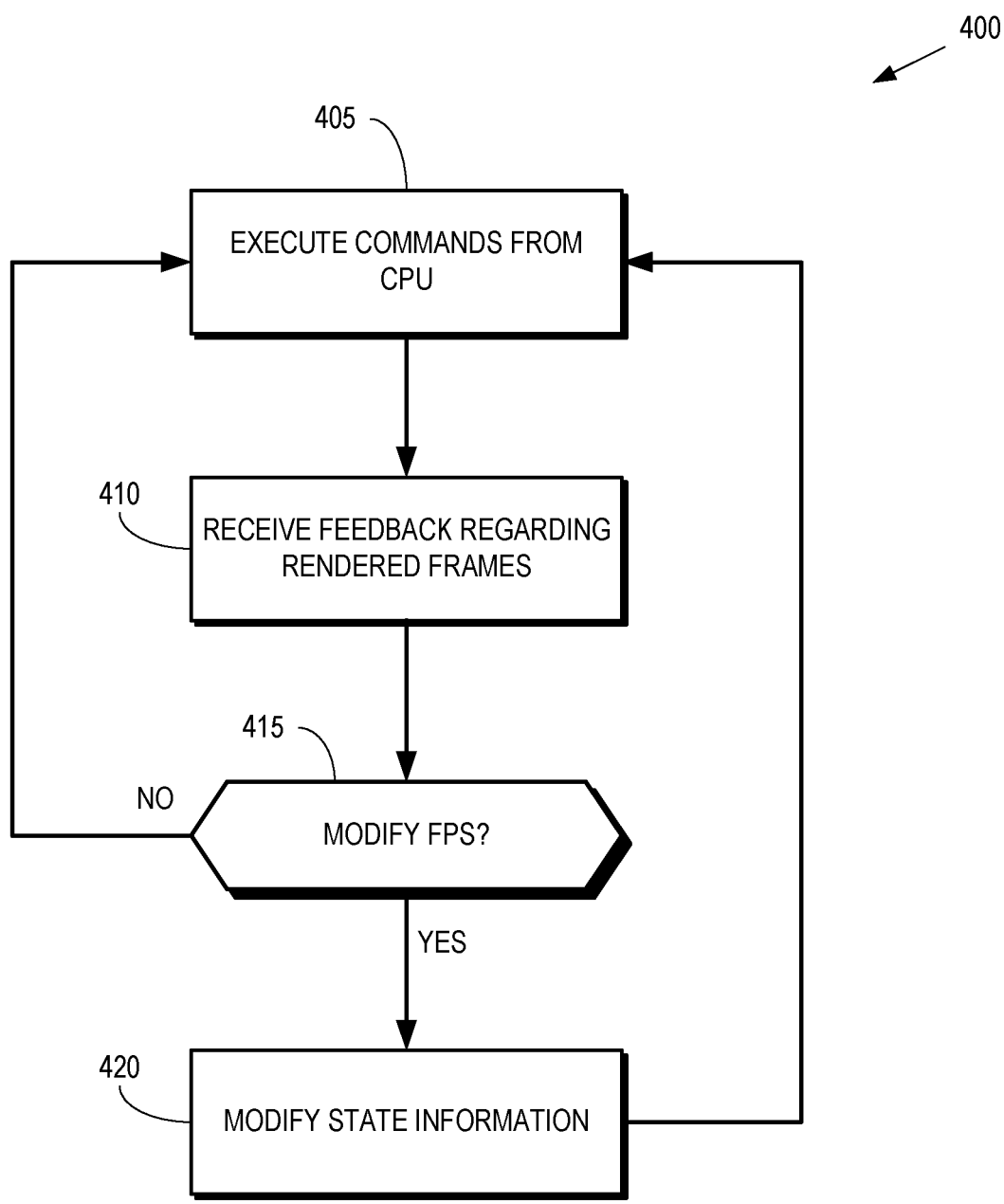
FIG. 4 is a flow diagram of a method of modifying frames per second (FPS) generated by a GPU during distributed user mode processing according to some embodiments.

FIG. 4 is a flow diagram of a method 400 of modifying frames per second (FPS) generated by a GPU during distributed user mode processing according to some embodiments. The method 400 is implemented in some embodiments of the processing system 100 shown in FIG. 1.

At block 405, eight GPU such as the GPU 110 shown in FIG. 1 schedules and executes commands received from a user mode driver in a CPU such as the CPU 105 shown in FIG. 1. In some embodiments, the commands are included in a draw call that also includes state information that is used to configure a context used by the GPU executing the commands in the draw call.

At block 410, the GPU receives feedback regarding rendered frames in response to executing the commands in the draw call. In some embodiments, the feedback is received from a display (or corresponding driver) and indicates a quality of the image presented on the display.

At decision block 415, the GPU determines whether to modify the FPS used to render frames based on the commands in the draw call. For example, the GPU can receive feedback indicating that the FPS used to render the frames should be reduced based on user input or other metrics. For another example, the GPU can receive feedback indicating that the FPS used to render the frames should be increased based on the user input or other metrics. If the GPU determines that the FPS should be modified, the method 400 flows to block 420. Otherwise, the method 400 flows back to block 405 and the GPU continues executing the commands.

At block 420, the GPU modifies state information based on the target modification of the FPS. For example, the GPU can modify the state information that is used to determine the context of the GPU so that the FPS of the rendered frames is increased or decreased, depending on the circumstances. The method 400 then flows back to block 405 and the GPU executes the commands based on the modified state information or context that determines the modified FPS. Thus, the FPS used by the GPU is modified without additional message exchange between the GPU and the CPU, which reduces latency and bandwidth consumed by the interface between the GPU and the CPU.

A computer readable storage medium includes any non-transitory storage medium, or combination of non-transitory storage media, accessible by a computer system during use to provide instructions and/or data to the computer system. Such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. Some embodiments of the computer readable storage medium are embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium is represented as source code, assembly language code, object code, or other instruction format that is interpreted or otherwise executable by one or more processors.

Note that not all of the activities or elements described above in the general description are required, that a portion of a specific activity or device is not required, and that one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter could be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above could be altered or modified and all such variations are considered within the scope of the disclosed subject matter. Accordingly, the protection sought herein is as set forth in the claims below.

What is claimed is:

1. A method, comprising:
    receiving, by a graphics processing unit (GPU), a first command for execution from a user mode driver executing on a second processing unit; and
    responsive to completing execution of the first command, generating, by the GPU, at least one additional command for execution by the GPU.

2. The method of claim 1, wherein the generating of the at least one additional command is performed as one of one or more user mode operations performed by the GPU responsive to completing execution of the first command.

3. The method of claim 1, wherein the generating of the at least one additional command is performed without notifying the second processing unit.

4. The method of claim 1, further comprising selecting, by the GPU and responsive to completing execution of the first command, one or more additional commands for execution by the GPU.

5. The method of claim 4, wherein receiving the first command for execution includes receiving state information associated with the first command from the second processing unit, and wherein selecting the at least one additional command includes selecting the at least one additional command based on the state information.

6. The method of claim 1, wherein the at least one additional command causes the GPU to write to memory one or more blocks of information comprising results generated from executing the first command.

7. The method of claim 1, wherein the at least one additional command comprises one or more of a filtering operation, a shader that is launched by the GPU, or a modification to a number of frames per second.

8. A graphics processing unit (GPU) comprising:
    a plurality of pipelines configured to execute commands; and
    a scheduler configured to:
        schedule a first command for execution by at least one pipeline of the plurality of pipelines, wherein the first command is received from a user mode driver executing on a second processing unit; and
        responsive to completing execution of the first command, generate at least one additional command for execution by the plurality of pipelines.

9. The GPU of claim 8, wherein the generation of the at least one additional command is performed as one of one or more user mode operations that are performed by the scheduler responsive to completing execution of the first command.

10. The GPU of claim 9, wherein the one or more user mode operations are performed without notifying the second processing unit.

11. The GPU of claim 8, wherein the scheduler is further configured to select, responsive to completing execution of the first command, one or more additional commands for execution by the plurality of pipelines.

12. The GPU of claim 11, wherein the first command is associated with state information received from the second processing unit, and wherein to select the one or more additional commands includes to select the one or more additional commands based on the associated state information.

13. The GPU of claim 11, wherein the one or more additional commands include at least one of a filtering operation, a shader that is launched by the GPU, or a modification to a number of frames per second.

14. The GPU of claim 8, further comprising a direct memory access (DMA) engine, wherein the at least one additional command causes the DMA engine to write to memory one or more blocks of information comprising results generated from executing the first command.

15. A method, comprising:
   generating at least one first command at a central processing unit (CPU);
   executing the at least one first command at a graphics processing unit (GPU) communicatively coupled to the CPU; and
   generating, by the GPU and without notifying the CPU, at least one second command for execution by the GPU in response to completing execution of the at least one first command.

16. The method of claim 15, further comprising selecting, by the GPU and responsive to completing execution of the first command, one or more additional commands for execution by the GPU.

17. The method of claim 16, wherein selecting the one or more additional commands includes selecting the one or more additional commands based on state information associated with the at least one first command.

18. The method of claim 15, wherein the one or more additional commands include one or more of a filtering operation, a shader initiated by the GPU, or a modification to a number of frames per second.

19. The method of claim 15, wherein the at least one second command causes the GPU to write to memory one or more blocks of information comprising results generated from executing the first command.

* * * * *